Figure 12:
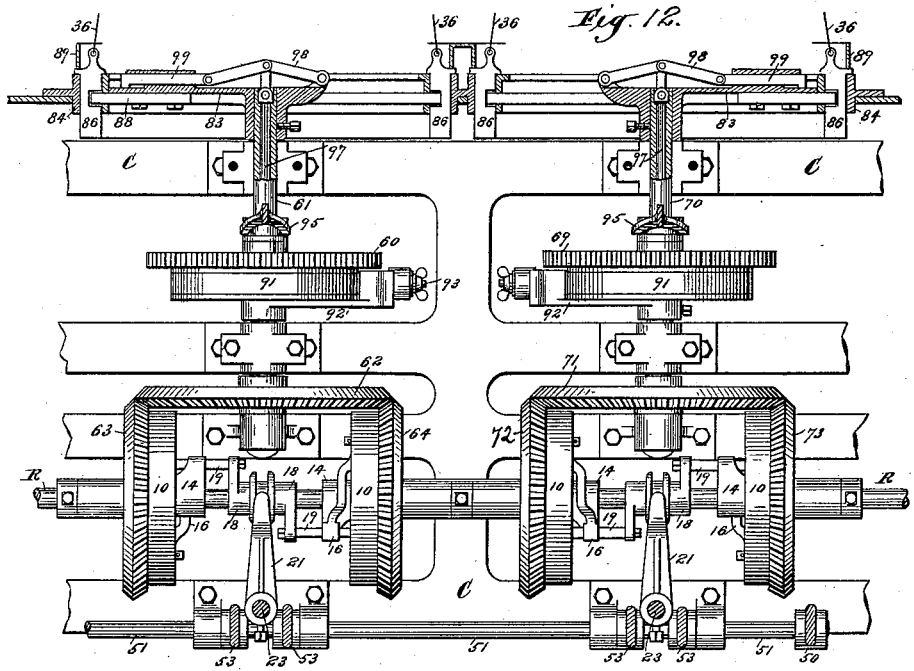

(No Model.) 10 Sheets—Sheet 1.
J. IRISH.
EMBROIDERING MACHINE.
No. 407,352. Patented July 23, 1889.
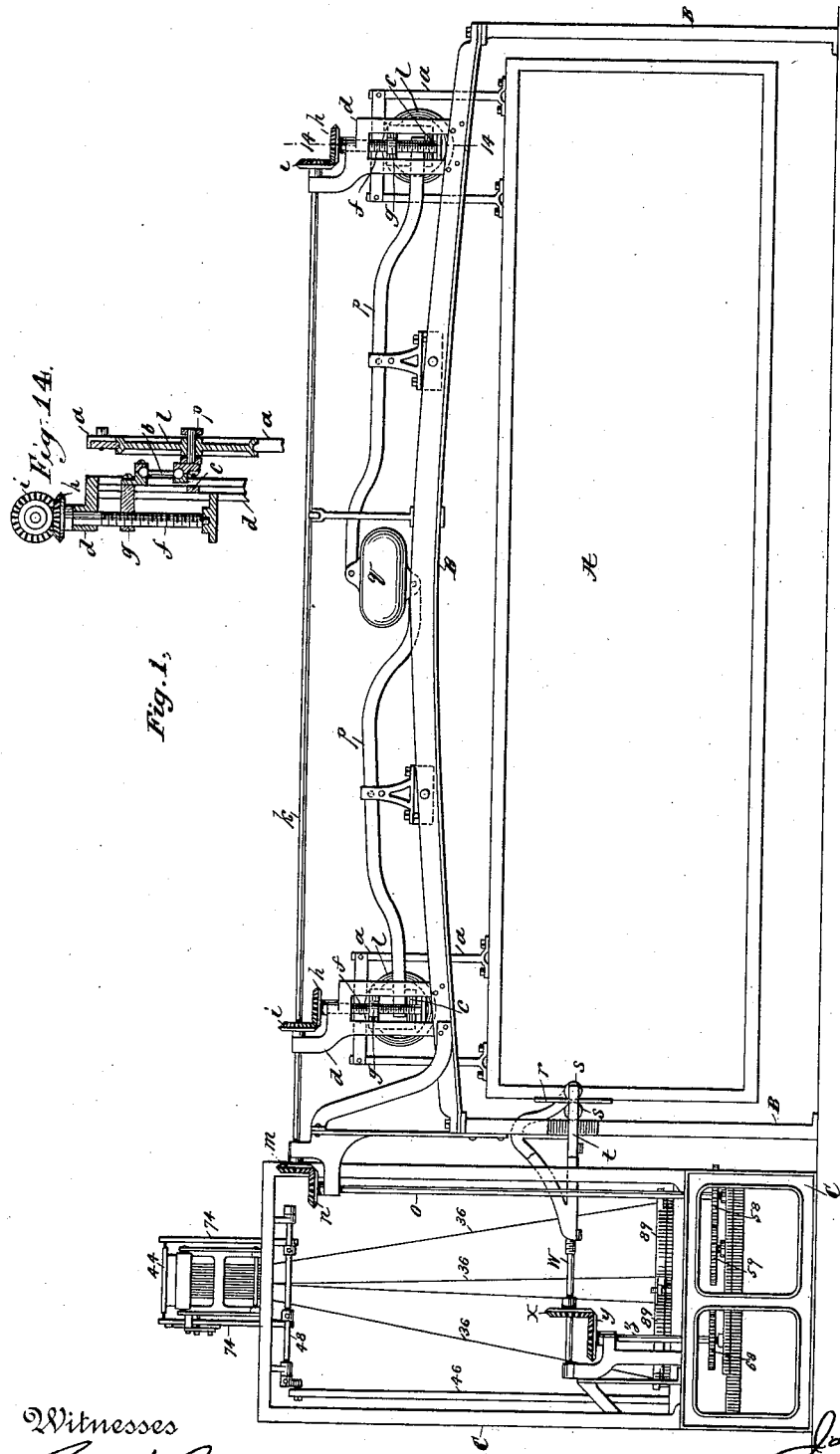
Witnesses
Geo H Both
D J Kennedy
Inventor
Joseph Irish
By his Attorneys
Philipp Phelps & Hovey (No Model.) 10 Sheets—Sheet 2.
J. IRISH.
EMBROIDERING MACHINE.
No. 407,352. Patented July 23, 1889.
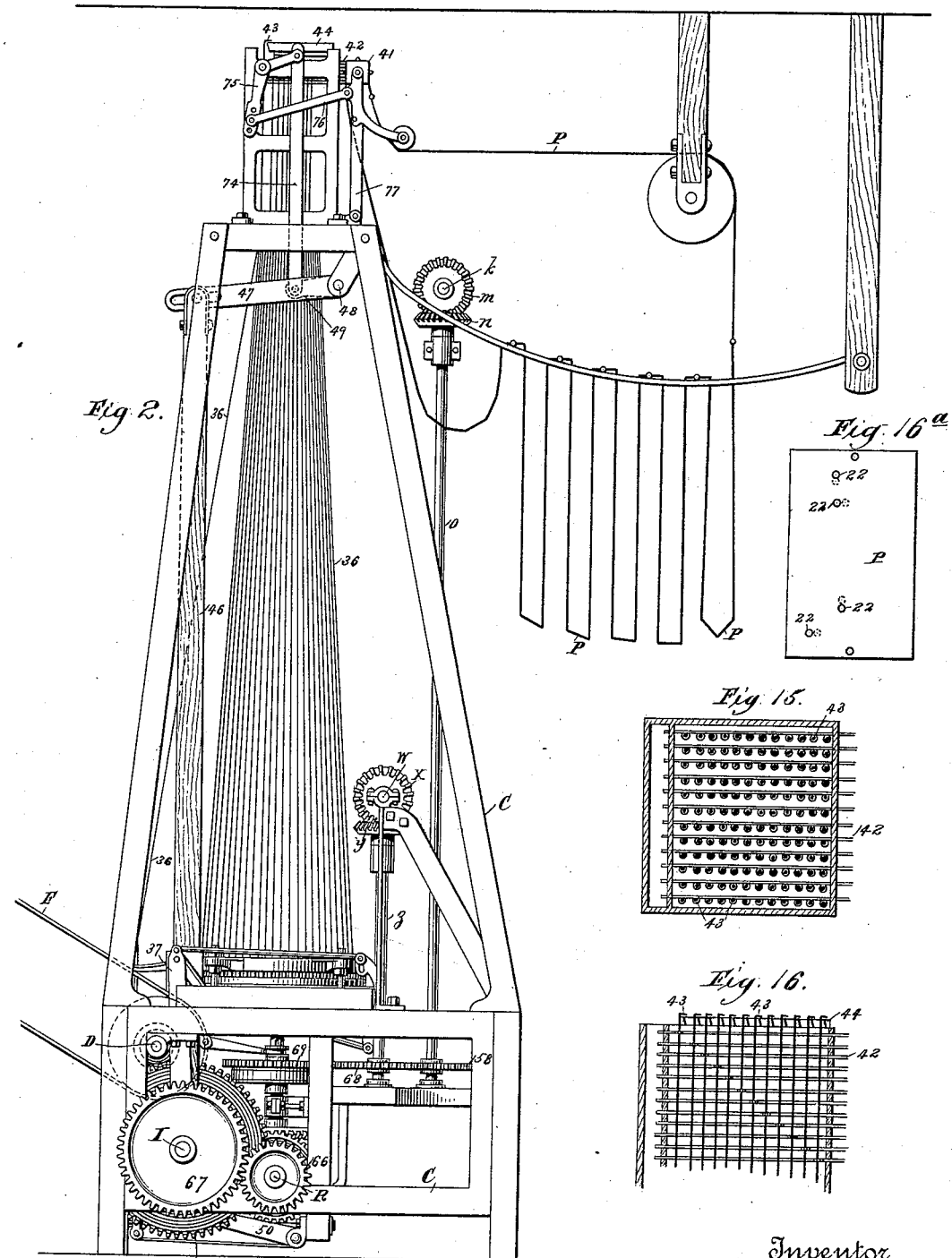

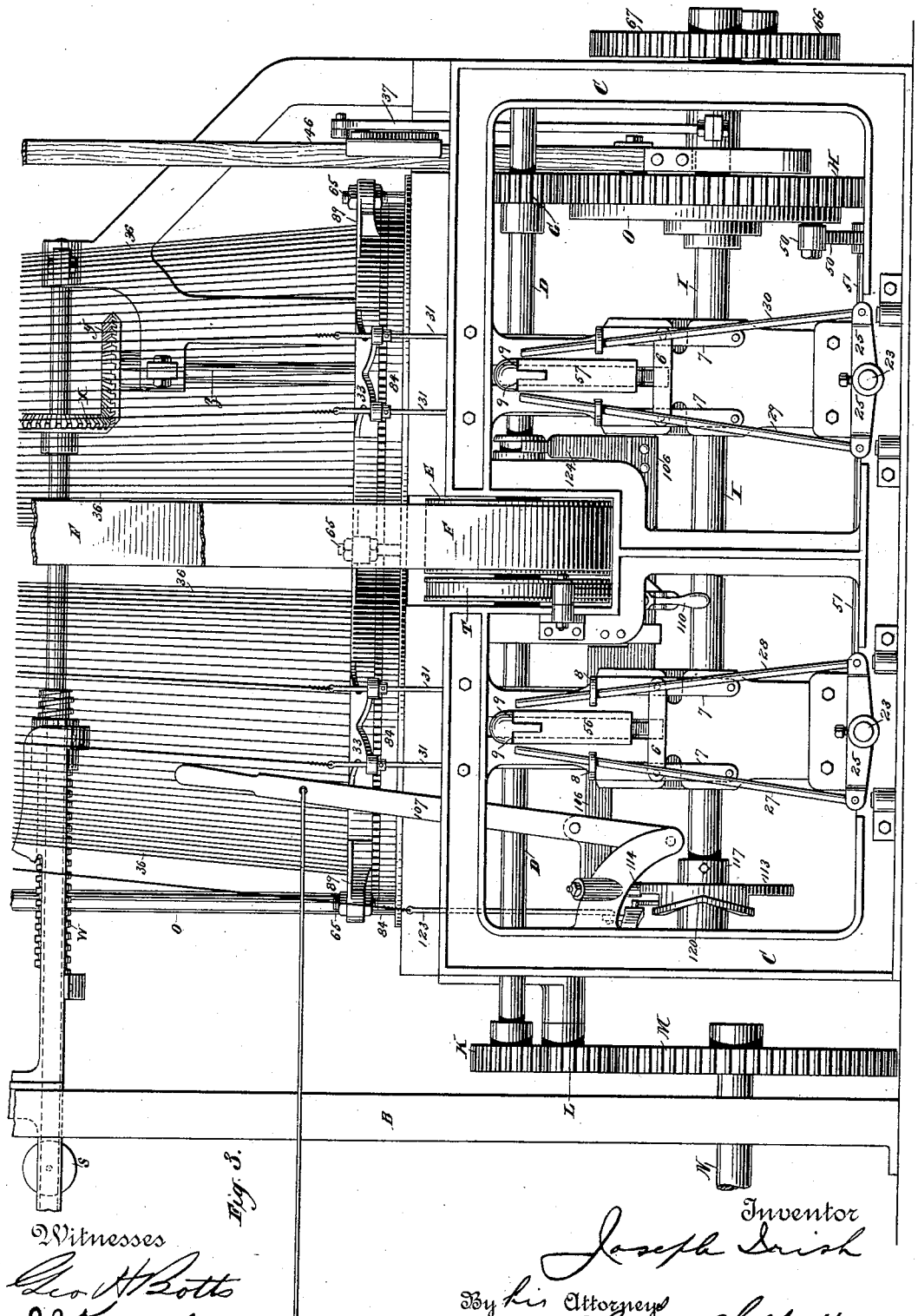

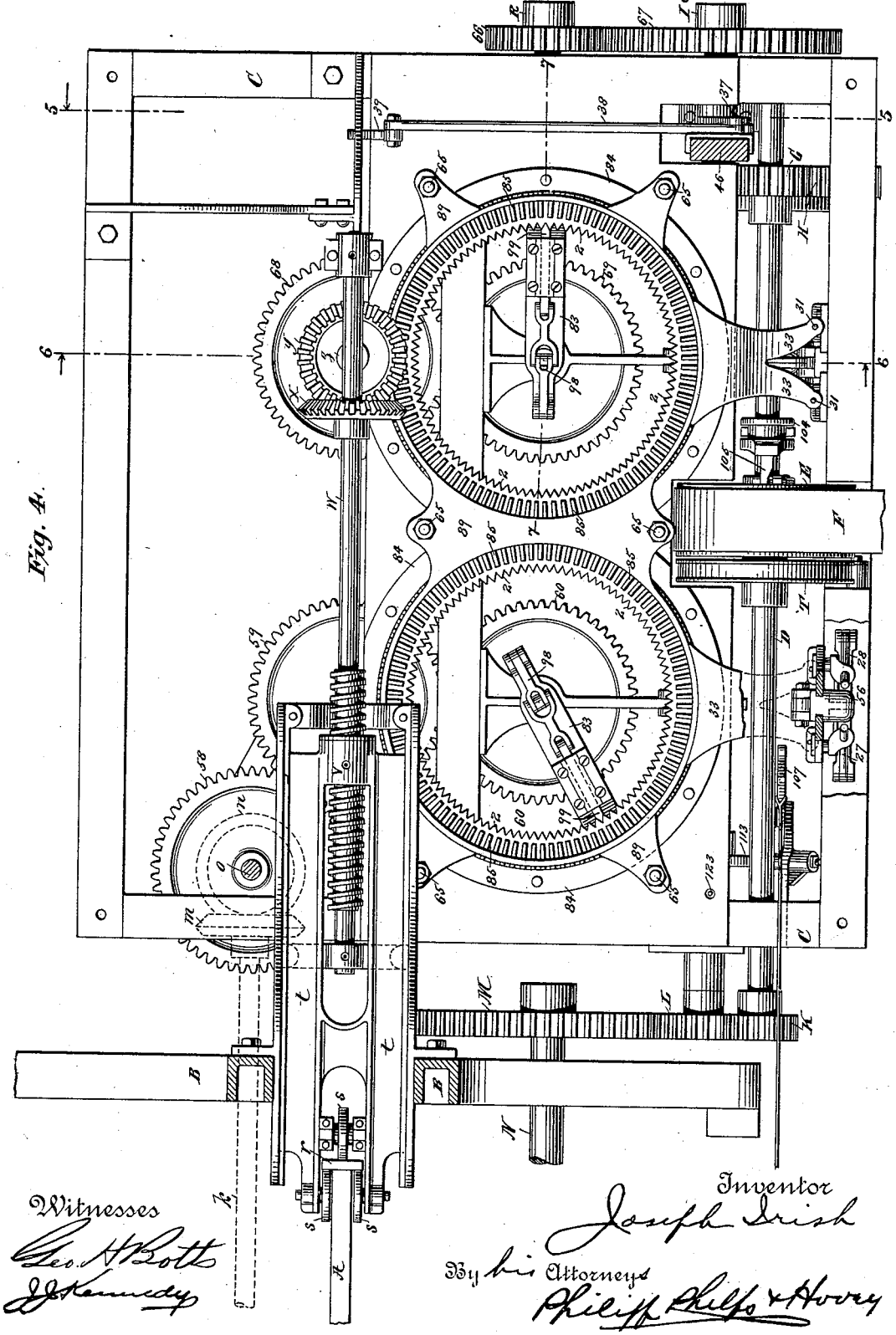

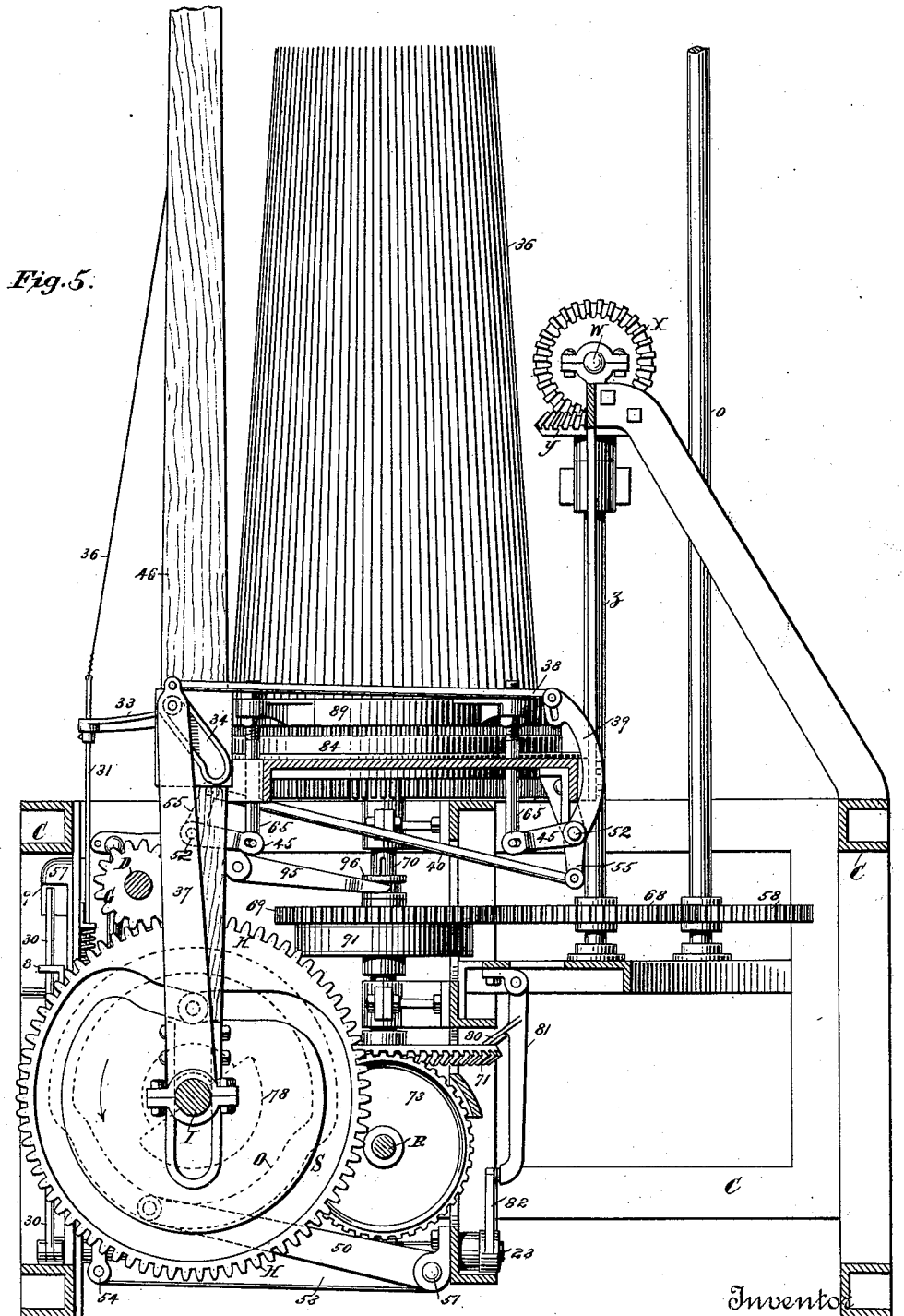

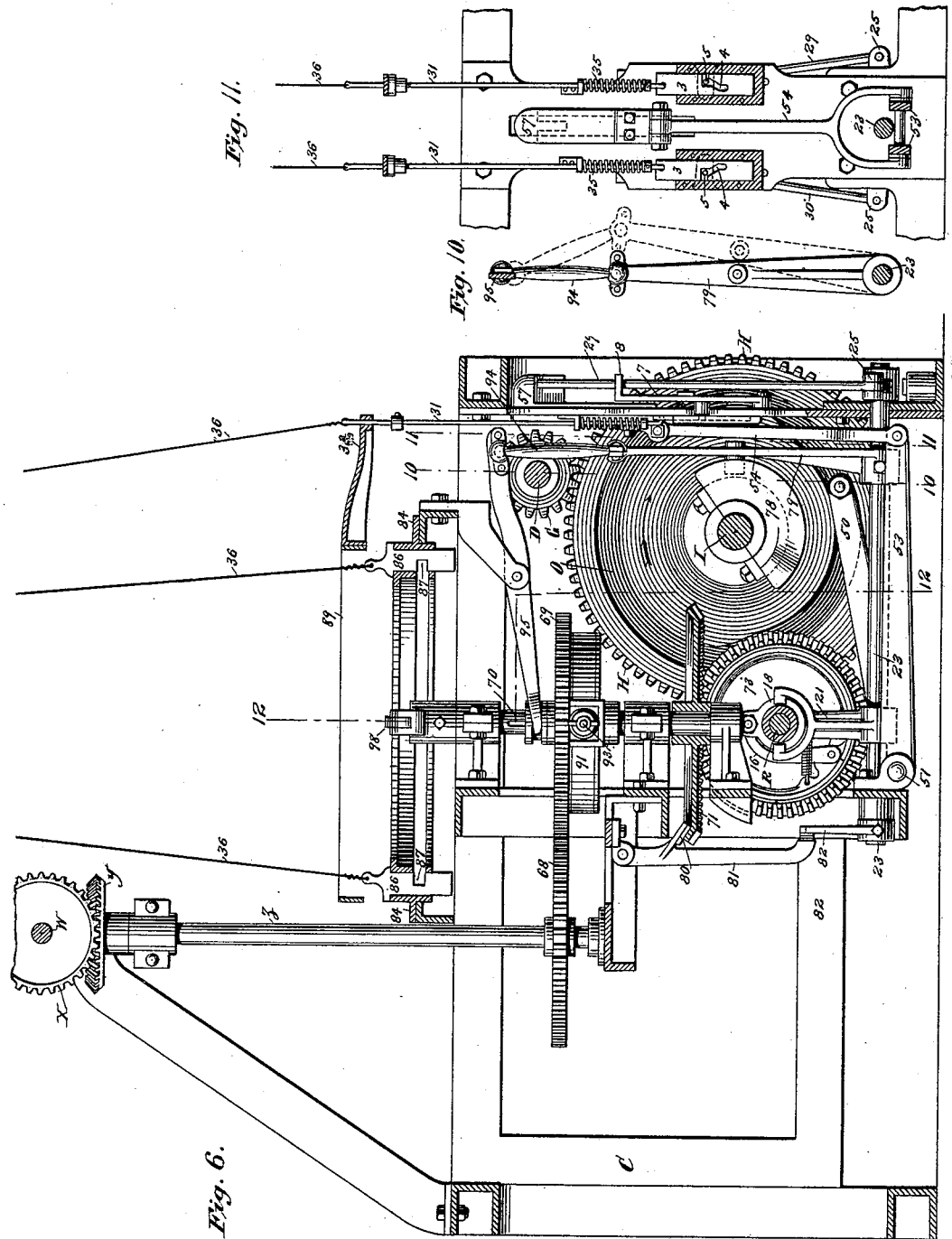

(No Model.) 10 Sheets—Sheet 7.
J. IRISH.
EMBROIDERING MACHINE.
No. 407,352. Patented July 23, 1889.
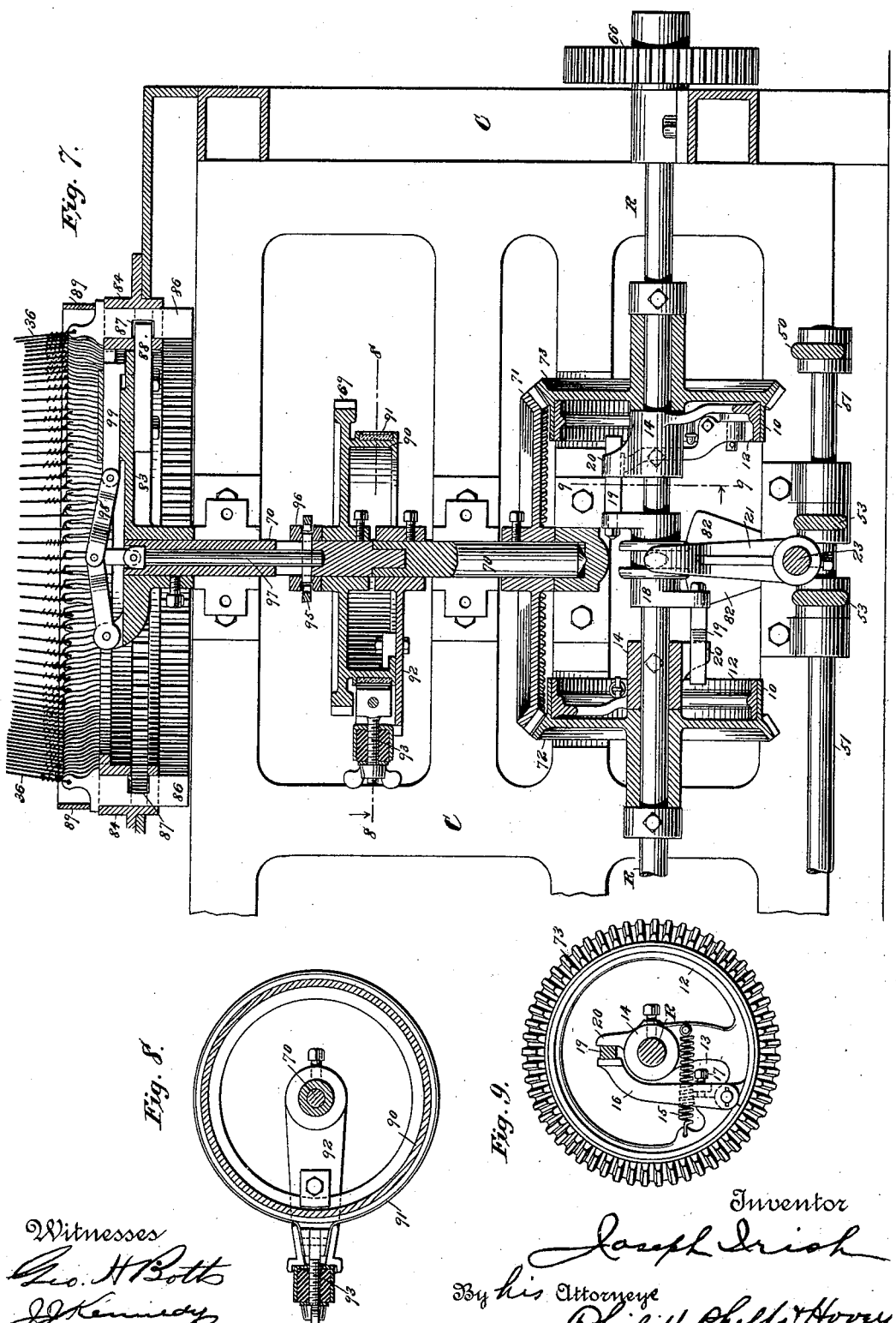
Witnesses
Geo. H. Botts
J. J. Kennedy
Inventor
Joseph Irish
By his Attorneys
Philipp Phelps & Hovey (No Model.)  10 Sheets—Sheet 8.

J. IRISH.
EMBROIDERING MACHINE.

No. 407,352.  Patented July 23, 1889.

Witnesses
Geo. H. Bott
J. J. Kennedy

Inventor
Joseph Irish
By his Attorneys
Philipp, Philipp & Hovey

N. PETERS, Photo-Lithographer, Washington, D.C.

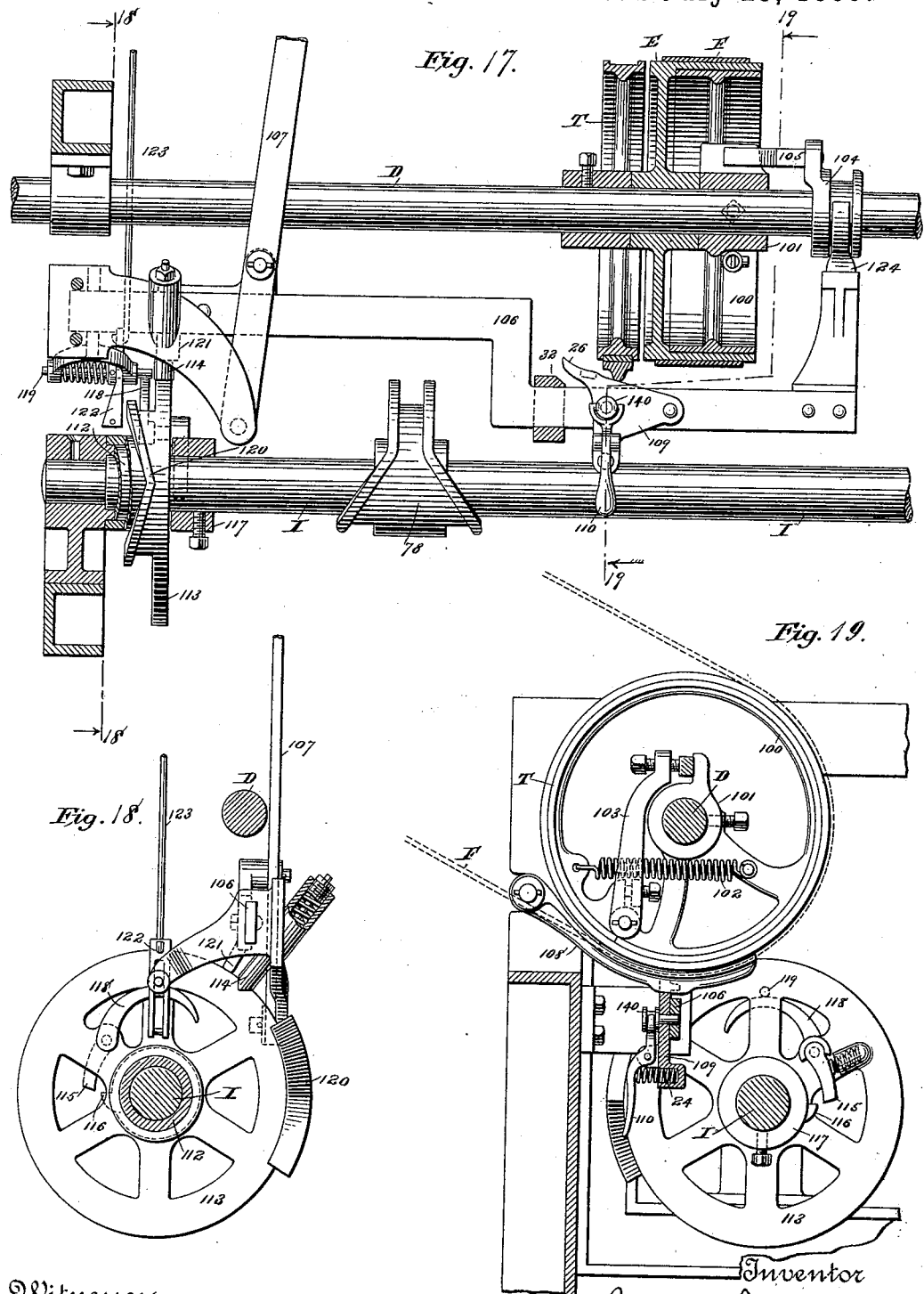

(No Model.)
10 Sheets—Sheet 10.
J. IRISH.
EMBROIDERING MACHINE.
No. 407,352. Patented July 23, 1889.
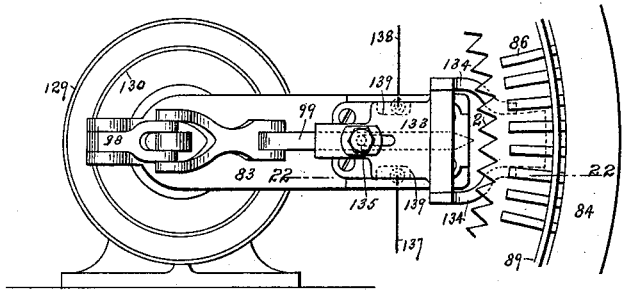
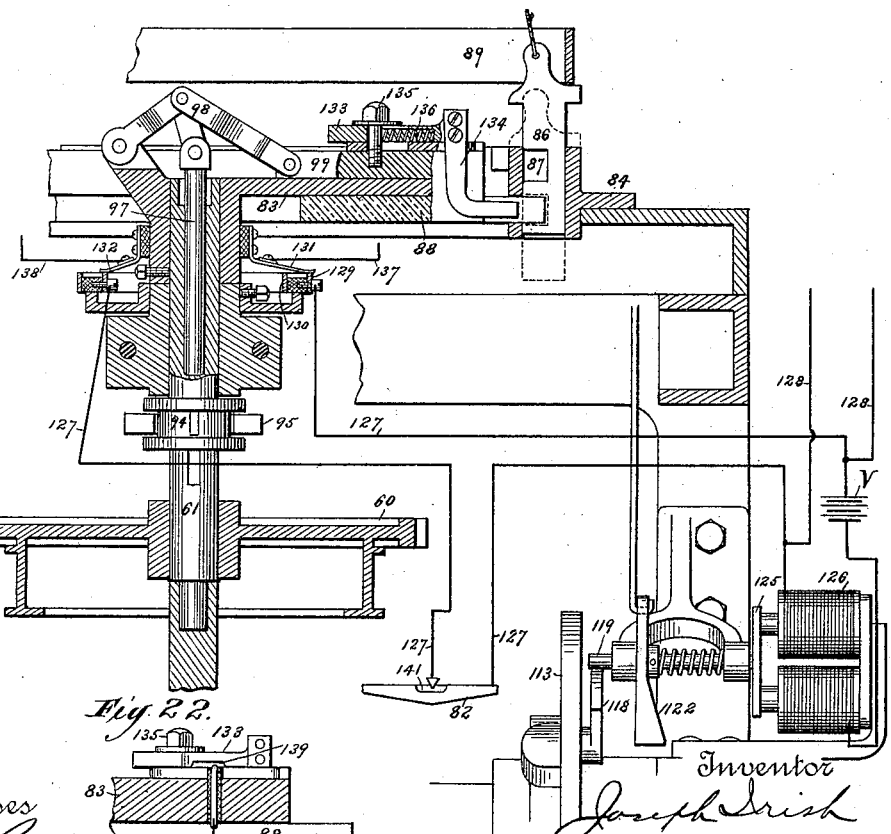

UNITED STATES PATENT OFFICE.

JOSEPH IRISH, OF BRIDGEPORT, CONNECTICUT, ASSIGNOR OF TWO-THIRDS TO JAMES McVICKAR, OF NEW YORK, N. Y.

EMBROIDERING-MACHINE.

SPECIFICATION forming part of Letters Patent No. 407,352, dated July 23, 1889.

Application filed December 15, 1888. Serial No. 293,662. (No model.)

*To all whom it may concern:*

Be it known that I, JOSEPH IRISH, a citizen of the United States, residing at Bridgeport, county of Fairfield, and State of Connecticut, have invented certain new and useful Improvements in Embroidery-Machines, fully described and represented in the following specification and the accompanying drawings, forming a part of the same.

This invention relates, generally, to that class of embroidery-machines in which the material to be embroidered is stretched in a frame called a "tambour-support," which has connections by which it can be moved after each stitch to so shift the material with relation to the needles as to cause the next stitch to be taken at the proper point, the direction and extent of the movement of the frame before each stitch is made being varied according as it is desired to vary the length and direction of the stitch.

The tambour-frame in the machines of this class is usually arranged in a vertical position, and it is therefore illustrated in the present case and will be referred to as arranged in such a position. It is to be understood, however, that the frame may be arranged horizontally or be inclined at an appropriate angle, and that the invention is not limited in its application to a machine in which the tambour-frame is arranged vertically, and also that the terms "up," "down," "left," and "right," as herein used in reference to the direction of movement of the tambour-frame, are simply intended to designate movements in directions crosswise of each other without reference to the plane in which the frame is arranged. In this class of machines, also, a large number of needles are usually employed, whereby many duplicates of each figure of the patterns are made simultaneously; but, if desirable, only a single needle may be employed, and the term "needles" as herein used is not therefore to be understood as limiting the invention to a machine in which a plurality of needles is employed.

In order to provide for all the stitches employed in the class of embroidery which is usually executed upon these machines, it is necessary that the connections for operating the tambour-frame should be so organized that the frame can be moved either up or down or to the right or left or in any intermediate direction and to any extent within the range required by the size of the pattern to be embroidered.

The present invention relates, particularly, to a mechanism for accomplishing these movements of the frame automatically through connections which are controlled by means of a pattern mechanism, consisting in the case illustrated of a Jacquard mechanism, the cards of which are perforated with reference to the pattern to be embroidered.

In order to enable a more easy understanding of the detailed description of the construction, organization, and operation of the machine, which will be hereinafter given, a brief general statement of its organization and operation will be first given.

The tambour-frame, which carries the fabric to be embroidered, is supported in a suitable frame-work, and is counterbalanced in any well-known manner, so as to be easily moved in any direction parallel with its face to present to the needles any required points on the fabric according to the direction and length of the stitch to be taken. The up-and-down and right-and-left movements of the frame are imparted by screw-shafts working in nuts, the nuts or shafts being arranged to rotate in either direction, independently or together. These shafts or nuts are operated so that each or both may move in either direction or in opposite directions separately or simultaneously, these movements being transmitted through connecting mechanisms which are automatically controlled by the pattern or Jacquard mechanism.

The connections for operating the respective screw shafts or nuts for giving the movements to the tambour-frame each include a tambour-frame-actuating shaft having a fixed gear which is in engagement with reversely-arranged loose gears that are provided with clutch mechanisms controlled by the pattern or Jacquard mechanism, by which either one of said gears can be connected to a driving-shaft and thus revolve the respective tambour-frame-actuating shafts so as to move the tambour-frame in either direction.

For the purpose of determining the extent of the movement of the tambour-frame in either direction, the connections through which its respective movements are derived are provided with frictional connections, which are so arranged that the tambour-frame may be arrested at any point in its movement in either direction. The arresting of the tambour-frame when it has been moved to the proper extent in either direction is accomplished automatically by means of a series of stops which are also controlled through suitable connections from the pattern or Jacquard mechanism. The mechanisms are so timed that the movement of the tambour-frame is effected during the time when the needles are withdrawn from the fabric upon the frame, and so that after the movement of the frame has been effected there will be a sufficient dwell before the next movement of the frame to permit the needles and their auxiliaries to act to form the stitches.

The Jacquard pattern mechanism shown is automatically operated through suitable connections with the driving-shaft of the machine, and is so timed as to shift the cards of the Jacquard while the needles are operating. This Jacquard mechanism is of substantially the ordinary form, and need not, therefore, be more specifically referred to at this point.

The organization thus briefly outlined will now be described in detail, reference being had to the accompanying drawings, in which—

Figure 13:
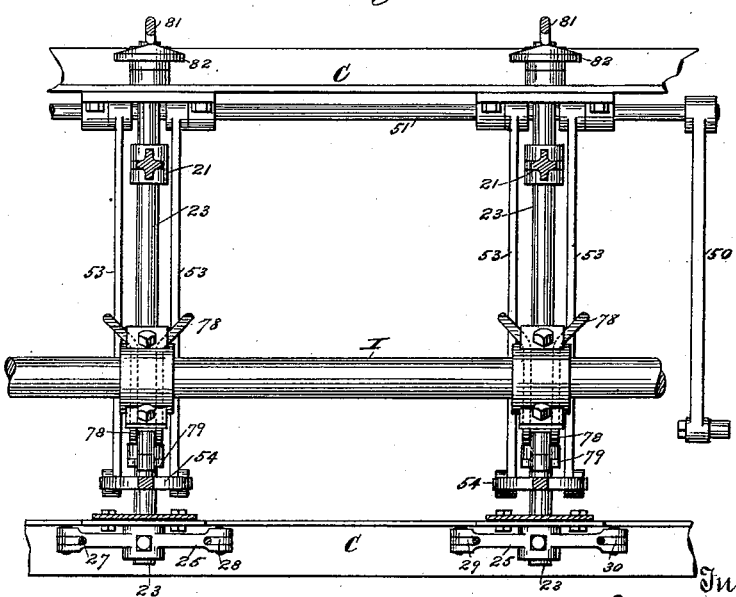

Figure 1 is a diagrammatic side elevation showing the general organization of the machine, the mechanism for carrying the needles and operating them being entirely omitted, as such mechanism forms no part of the present invention. Fig. 2 is an enlarged end elevation of the machine, looking from the left of Fig. 1. Fig. 3 is an enlarged side elevation of the mechanism for controlling the movements of the tambour-frame, looking from the side opposite that shown in Fig. 1. Fig. 4 is an enlarged plan view of the mechanism for controlling the movements of the tambour-frame, the Jacquard mechanism, and also the stops which control the extent of the movement of the frame, being omitted. Fig. 5 is a vertical section taken on the line 5 of Fig. 4, looking in the direction of the arrow. Fig. 6 is a similar view taken on the line 6 of the same figure, looking in the direction of the arrow. Fig. 7 is a similar view taken on the line 7 of the same figure. Figs. 8 and 9 are sectional details taken, respectively, on the lines 8 and 9 of Fig. 7, looking in the directions of the arrows. Figs. 10 and 11 are sectional details taken, respectively, on the lines 10 and 11 of Fig. 6. Fig. 12 is an irregular vertical section, somewhat reduced, taken on, substantially, the line 12 of Fig. 6. Fig. 13 is a horizontal section showing the mechanism in the lower part of the frame-work. Fig. 14 is an enlarged section taken on the line 14 of Fig. 1. Figs. 15 and 16 are respectively enlarged horizontal and vertical sections of the Jacquard mechanism. Fig. 16$^a$ is a view of one of the cards of the Jacquard. Fig. 17 is an enlarged elevation, partly in section, of a mechanism for stopping the machine in such manner that the parts will be arrested at certain predetermined positions with relation to each other. Fig. 18 is a vertical section taken on the line 18 of Fig. 17, looking in the direction of the arrows. Fig. 19 is a similar view taken on the line 19 of the same figure, looking in the direction of the arrows. Fig. 20 is an enlarged plan view, partly in section, of a portion of one of the mechanisms for controlling the extent of the movement of the tambour-frame, showing a safety stop mechanism which may be applied. Fig. 21 is a central vertical section of the same parts. Fig. 22 is a section taken on the line 22 of Fig. 20.

Referring now particularly to Figs. 1, 4, and 14, it is to be understood that the tambour-frame A, which is of substantially the ordinary form, is in the case shown hung vertically in a suitable frame-work B and in such manner as to be capable of moving freely up and down and to the right and left. For this purpose the frame is provided upon its upper side and near its opposite ends with supplemental frames $a$, which pass between the two girders which form the top of the frame-work B. The tambour-frame is guided in its movements in any suitable manner. The tambour-frame is supported upon grooved pulleys $l$, upon which the upper parts of the frames $a$ rest, so as to permit the tambour-frame to be moved freely in a horizontal direction. The pulleys $l$ are carried in the bifurcated ends of a pair of levers $p$, which are fulcrumed upon the frame-work B and are suitably weighted, as indicated at $q$, to counterbalance the frame and permit it to be moved easily in either direction and to equalize the power required to move it up and down.

The vertical movement of the tambour-frame is accomplished by means of screw-shafts $f$, which are supported in brackets $d$, rising from the frame-work B near its opposite ends, and work in nuts $g$, formed upon or connected to cross-heads $c$, which reciprocate in ways formed in the brackets $d$ and are connected to the ends of the levers $p$ by means of rods $b$. The rods $b$ are connected to the cross-heads $c$ and levers $p$ by universal joints preferably of the ball-and-socket form, as shown. By this means the swinging of the lower ends of the rods $b$ as the tambour-frame is raised and lowered, which is occasioned by their connection with the levers $p$, is prevented from exerting any tendency to bind the cross-heads $c$ in their ways. The universal joints of the rods $b$ also permit the tambour-frame to be adjusted laterally to vary the distance of the fabric from the needles and shuttles, as is frequently required.

The shafts $f$ are provided at their upper ends with beveled gears $h$, which are engaged by corresponding gears $i$, secured to a shaft $k$, having a gear $m$, which is engaged by a similar gear $n$, carried by a vertical shaft $o$, through which motion is imparted to the shaft $k$ and gears $i$ $h$, so as to revolve the screw-shafts $f$ in either direction, and thus, through the connections which have been described, impart an up or down movement to the tambour-frame, according to the direction in which the shafts $f$ are turned.

For the purpose of imparting the necessary right-and-left movement to the tambour-frame it is provided at its end next the operating mechanism with flanges $r$, which move freely up and down between anti-friction rolls $s$, carried by a cross-head $t$, which slides horizontally in bearings formed upon the frame-work B. The cross-head $t$ is provided with a nut $v$, in which works a screw-shaft $w$, having a gear $x$, which is engaged by a similar gear $y$, carried by a vertical shaft $z$, through which motion is imparted to the shaft $w$ and through the connections which have been described to the tambour-frame, so as to move it to the right or left, according to the direction in which the shaft $w$ is turned.

The mechanism for imparting the necessary movements to the shafts $o$ $z$ is supported in a suitable frame-work C, located at the end of the frame-work B, which supports the tambour-frame. The frame C (see Figs. 2 to 13) affords bearings for a shaft D, which in this case has the driving-pulley E, which receives motion through a belt F from any suitable source of power. The shaft D is provided with a gear K, which engages with an intermediate L, through which motion is imparted to a gear M upon a shaft N, which drives the needle-operating mechanism. This latter mechanism and the connections for operating it form no part of the present invention and are not herein illustrated, and will not therefore be more particularly referred to. The shaft D is also provided with a gear G, which engages with a gear H, fixed upon a shaft I, which latter shaft is provided with a gear 67, which engages with a gear 66, fixed upon a second shaft R. The shaft R is the driving-shaft, and power may be applied to it direct instead of to the shaft D, if desired. For this purpose the shaft $o$ (see Figs. 4 and 12) is provided with a gear 58, which engages through an intermediate 59 with a gear 60, fixed upon a vertical tambour-frame-actuating shaft 61, which also carries a beveled gear 62, which is engaged upon opposite sides by reversely-arranged beveled gears 63 64, mounted loosely upon the driving-shaft R. The shaft $z$ (see Figs. 4, 7, and 12,) is similarly provided with a gear 68, which engages with a gear 69, fixed upon a second vertical tambour-frame-actuating shaft 70, similar to the shaft 61 and having a beveled gear 71, which is engaged upon its opposite sides by a pair of reversely-arranged beveled gears 72 73, similar to the gears 63 64, and also mounted loosely upon the driving-shaft R. The gears 63 64 and 72 73 constitute reversing gears or gearing for transmitting the motion of the shaft R to the shafts 61 70.

It will be seen from the organization of the connections as thus far described that so long as the gears 63 64 and 72 73 remain loose upon the driving-shaft R no motion will be imparted in either direction to the gears 62 and 71, and as a consequence the actuating-shafts 61 and 70 will remain stationary, and no motion will be imparted in either direction to the tambour-frame. If, however, the gear 63 is clutched to the driving-shaft R so as to turn with the shaft, the gear 64 remaining loose upon the shaft, motion will be imparted to the gear 62 and actuating-shaft 61, so as to set the gear 60 in motion and, through the connections which have been described, turn the screw-shafts $f$, so as to impart an upward movement to the tambour-frame. On the other hand, if the gear 64 is clutched to the driving-shaft R, the gear 63 being loose, motion will be imparted to the gear 62 and actuating-shaft 61 in the reverse direction and will impart a reverse movement to the screw-shafts $f$ and move the tambour-frame downward. It will likewise be seen that if the gear 72 is clutched to the driving-shaft R, the gear 73 remaining loose, motion will be imparted to the gear 71 and actuating-shaft 70, so as to set the gear 69 in motion and, through the shaft $z$, revolve the screw-shaft $w$, so as to move the tambour-frame to the left, while if the gear 73 is clutched to the driving-shaft R, the gear 72 remaining loose, the connections and the shaft $w$ will be moved in the reverse direction, so as to move the tambour-frame to the right. It will further be seen that if one of the gears of each of the pairs 63 64 and 72 73 are simultaneously clutched to the driving-shaft R, the other gear for each pair remaining loose, the tambour-frame will be moved obliquely either upward and to the left or right or downward and to the left or right, according to the gears of each pair which are clutched to the shaft.

For the purpose of clutching the respective gears 63 64 and 72 73 to the driving-shaft R, to impart movement in the required direction or directions to the tambour-frame, each of the gears is provided with a friction-clutch mechanism, which is operated automatically at the proper time in a manner to be presently explained. These clutch mechanisms are exact duplicates as to their details, and a description of the mechanism for one pair of the gears will apply to both. Each of the gears is provided with an inwardly-projecting rim 10, (see Figs. 7 and 9,) within which lies an expansible friction-band 12, one end of which is secured rigidly to an arm 13, extending from a collar 14, fixed upon the driving-shaft R. The opposite or free end of the band is connected to the arm 13 by a spring 15, the tendency of which is to contract the friction-band 12, so as to reduce or entirely remove the friction between it and the rim of the gear.

Fulcrumed upon a projection of the arm 13 is a lever 16, having a stud or set-screw 17, which engages with a shoulder upon the free end of the band 12 in such manner that when the lever 16 is rocked away from the arm 13 the band 12 will be expanded so as to press outward against the rim of the gear and lock the gear to the shaft R sufficiently to set it in motion, and thereby, through the connections which have been described, impart movement to the tambour-frame.

The driving-shaft R is provided between each of the pairs of gears 63 64 and 72 73 with a sleeve 18, which turns with the shaft, but is capable of a sliding movement thereon, and is provided at its opposite ends with wedges 19, which enter between the free ends of the levers 16 and studs 20, projecting from the collars 14. From this it will be seen that whenever the sleeve 18 is shifted toward either one of the gears the wedge 19 projecting from the end of the collar next the gear toward which it is shifted will be forced between the stud 20 and lever 16 of the clutch of that gear, so as to rock the lever and expand the band 12 into frictional contact with the rim 10, and thus clutch the gear to the shaft. The wedges 19 are so formed that when the sleeve 18 is in its mid-position both wedges will be sufficiently withdrawn to allow both gears to turn freely upon the shaft.

The clutches for the respective gears 63 64 and 72 73 are automatically operated at the proper times, as follows: The shaft I is provided with a cam O, in the path of which travels the bowl of a rock-arm 50, which is connected to a rock-shaft 51, located near the base of the frame-work C. The cam O is so shaped that at each revolution of the shaft I the arm 50 will be moved so as to impart a rocking movement to the shaft 51. The shaft 51 is provided with two rock-arms or pairs of rock-arms 53, (see Figs. 12 and 13,) which are pivotally connected by means of links 54 with a pair of heads 56 57, (see Figs. 3, 6, and 11,) which reciprocate vertically in ways formed in the frame-work of the machine.

The sleeves 18, located between the respective pairs of gears 63 64 and 72 73 are provided with circumferential grooves into which enter studs projecting from yoke-arms 21, which are secured to rock-shafts 23, which extend beneath the respective heads 56 57 and are provided with double rock-arms 25, to the opposite ends of which are pivoted vertical or substantially vertical rods 27 28 29 30, the upper ends of which are arranged to be brought into engagement with shoulders 9, formed upon the heads 56 57. From this organization it results that if the rod 27 is rocked inward, so as to be engaged by the shoulder 9 of the head 56 upon the downward movement of that head, (the rod 28 remaining out of engagement with the opposite shoulder 9 of the head,) the shaft 23 will be rocked so as to shift the sleeve 18, with which it is connected, and operate the wedge 19 to clutch the gear 63 to the driving-shaft R, thus setting said gear in motion and causing it, through the connections which have been described, to impart an upward movement to the tambour-frame, while if the rod 28 is rocked inward, so as to engage with the shoulder 9 of the head 56 upon the downward movement of the head, (the rod 27 remaining out of engagement with the opposite shoulder upon the head,) the shaft 23 will be rocked in the reverse direction, so as to clutch the gear 64 to the driving-shaft R and impart a downward movement to the tambour-frame. Similarly it will be seen that if the rod 29 is rocked inward, so as to engage with the shoulder 9 upon the head 57 upon the downward movement of the head, the other shaft 23 will be rocked so as to shift the other sleeve 18 and through the wedge 19 clutch the gear 72 to the driving-shaft R, and thus, through the connections which have been described, move the tambour-frame to the left, while, on the other hand if the rod 30 is rocked inward, so as to engage with the opposite shoulder 9 of the head 57 upon the downward movement of the head, the shaft 23 will be rocked in the opposite direction, so as to clutch the gear 73 to the driving-shaft R and move the tambour-frame to the right. It will thus be seen that in order to cause the tambour-frame to move up or down, or to the left or right, or obliquely up and to the left or right, or down and to the left or right, it is only necessary to cause the proper one of the rods 27, 28, 29, or 30, or the proper one of each of the pairs 27 28 and 29 30 to be rocked inward at the proper time to be engaged by the head 56 or 57, or by both the heads, as they are moved downward by the action of the cam O, as before described.

The rods 27 28 and 29 30 are, as before stated, pivoted at their lower ends to the arms 25, so as to be capable of swinging with relation to the arms. Each of the rods near its upper end passes through a guide-opening formed in a lateral projection 8 of a plate 7, (see Figs. 3, 6, and 11,) which is pivoted at its lower end upon a stationary part of the frame-work. The two plates 7 of each pair are connected by a strap 6, so that any motion imparted to either of the plates 7 will be communicated to the other plate with which it is connected. Each of the plates 7 is provided upon its inner side with a stud 5, which passes through a recess in the frame and enters an inclined slot 4 formed in a plate 3, which is arranged to move vertically in a suitable guideway formed in the frame-work. The slots 4 of the two plates 3 of each pair are inclined in opposite directions, and are so arranged that when the two plates are in their depressed position, as shown, the studs 5 are held in such position as to rock the rods 27 28 and 29 30 to a central position, so that neither of the rods will be in position to be engaged by the heads 56 57 when the heads are depressed. When, however, either one of the plates of the pair is raised, the slot 4 of the plate, acting upon the stud 5, will rock the corresponding plate 7, so as to rock inward the rod 27, 28, 29, or 30, as the case may be, and bring its upper end into position to be engaged by the shoulder 9 of the head 56 or 57, as the case may be, upon the downward movement of the head. The plates 3 are connected, respectively, at their upper ends to rods 31, having light springs 35, which operate to normally hold the rods and the plates 3 in their depressed position, as shown in Fig. 11.

The selection of the proper rod or rods 31 to be moved in order to rock the proper rod or rods of the pairs 27 28 and 29 30 into position to be engaged by the head 56 or 57, or both, for each stitch and the movement of the rod or rods so selected are automatically effected by means of the Jacquard mechanism, which will be presently described.

It has now been explained how at each revolution of the shaft I the heads 56 57 are caused to make a downward movement, so as to engage with and depress any of the rods 27 28 29 30 which have been rocked by the Jacquard mechanism, and thereby, through the connections which have been described, set one or both of the shafts 61 and 70 in motion in the required direction to give the proper movement to the tambour-frame. After the heads 56 57 have completed their downward movement and during the last part of the revolution of the shaft I the arm 50 will be operated in the reverse direction, so as to restore said heads to their raised position. As the heads are thus raised the springs 35 will restore the plates 3 to their normal position and rock the rods 27 28, &c., away from position beneath the shoulders 9 of the heads. After the shaft or shafts 23 has or have been rocked by the downward movements of the heads 56 57, so as to clutch one or more of the gears 63 64 72 73 to the driving-shaft R, and thus, through the connections which have been described, move the tambour-frame, and after the tambour-frame, has been moved it is necessary that the gear or gears which has or have been clutched to the driving-shaft R should be unclutched from the shaft and the shafts 23 restored to their normal position before the commencement of the next revolution of the shaft I, in order that the rods 27 28, &c., may be in proper position to be rocked beneath the shoulders 9 of the heads.

The unclutching of the gear or gears 63 64 72 73, which has or have been clutched to the shaft, is automatically effected by means of cams 78, which are carried by the shaft I and act upon studs or bowls projecting from rock-arms 79, carried by the shafts 23, the cams 78 being so positioned that as the shaft I completes each revolution they will rock the arms 79 and shafts 23 to a central position, and thus restore the sleeves 18 to their mid-position.

In order to aid in overcoming the momentum of the gears 62 and 71 and the parts connected therewith, so that said parts will come to rest promptly upon the unclutching of the gears 63 64 72 73 from the driving-shaft R, they are provided with brake mechanisms (see Figs. 5 and 6) which operate upon said gears and are automatically applied and removed simultaneously with the clutching and unclutching of the gears 63 64 72 73. These brake mechanisms consist of brake-shoes 80, which bear upon the flanges of the gears 62 71 and are carried upon levers 81, the free ends of which are acted upon by cams 82, carried by the shafts 23, these cams being so shaped that when the shafts 23 are in their normal position they will rock the levers 81 and apply the brakes, and that as the shafts are rocked either way from the normal position the levers 81 will be allowed to move in the reverse direction to remove the brakes.

It has now been explained how at each revolution of the shaft I the tambour-frame is moved in the required direction to give the proper direction to the successive stitches, and also how the mechanism through which this movement of the tambour-frame is effected is at the end of each revolution of the shaft I restored to its normal position preparatory to imparting a new movement to the frame upon the next revolution of the shaft.

If all of the stitches of the pattern to be embroidered were of the same length, the mechanism which has been described would be all that would be required to control the movements of the frame. The stitches, however, are not all of the same length, but vary within quite wide limits. It is therefore necessary to provide means by which the distances which the tambour-frame is moved in either direction for each stitch will be varied to conform to the length of the required stitch. This variation in the distance to which the frame is moved is also determined and controlled through suitable connections from the Jacquard mechanism. For this purpose the tambour-frame-actuating shafts 61 and 70 are provided with arms 83, which, as the shafts are revolved, sweep around the shafts within annular frames 84, which surround the upper ends of the shafts. The frames 84 are provided with a series of recesses 85, located around the circumference of the frames, into which are fitted loosely-moving stops 86, having upon their inner edges recesses 87, which coincide and form a continuous channel through the entire series of stops. The arms 83 are provided with forwardly-projecting extensions 88, preferably made of rawhide or other slightly-yielding material, which enter and sweep around in the space formed by the recesses 87 of the stops 86. The stops 86 are connected by wires or other suitable connections with the pattern or Jacquard mechanism.

The operation of this part of the apparatus is as follows: So long as all of the stops 86 remain in their normal positions, so that the openings 87 of all of the stops coincide, the sweep of the arms 83 will be uninterrupted, and the actuating-shafts 61 and 70 will continue their movement in one direction or the other (depending upon which of the gears 63 64 and 72 73 is clutched to the driving-shaft R) until they are arrested by the unclutching of said gears, as before described, and as a consequence the tambour-frame will make its maximum movement in the particular direction in which it is moved. When, however, the stitch which is to be made is of less than the maximum length in either or both directions, one of the stops 86 of one or each of the sets will be raised, so as to be interposed into the path of the extension 88 of one or both of the arms 83, and thus arrest the arm or arms 83 and the tambour-frame after the frame has made the necessary movement in one or both directions for that particular stitch. The particular stop or stops 86 to be raised will be determined by the length of the stitch to be taken, and will be located such a distance from the arm or arms 83 at the commencement of its or their movement as to permit the frame to be moved the required distance before being arrested. It will thus be seen that the actuating-shafts 61 and 70 are, when the stitch to be taken is of less than the maximum length, arrested while the gears through which the shafts are driven are still clutched to the driving-shaft R. The friction-bands 12 of these gears and the wedges 19 may, however, be so adjusted that the friction between the bands and the rims of the gears, while being sufficient to move the tambour-frame, will yield and permit the driving-shaft R to revolve without danger of breaking the parts after the shafts 61 and 70 are arrested. In practice, however, it is preferable so to adjust the bands 12 and wedges 19 that the gears 63 64 72 73 will be very firmly clutched to the shaft R, and in order to permit the tambour-frame to be arrested without danger to the machine when the bands 12 and wedges 19 are thus adjusted the actuating-shafts 61 and 70 are made in two parts, which are capable of turning with relation to each other, and one of which parts carries the gears 62 71, while the other part carries the gears 60 69. The two parts of the actuating-shafts 61 70 are connected by friction-clutches which will yield more readily than the friction-clutches which connect the gears 63 64 72 73 to the shaft R. For this purpose the gears 60 69, which, as before explained, are fixed to one part of the shafts, are provided with rims 90, (see Figs. 7 and 8,) which are surrounded by friction-bands 91, which are connected to arms 92, fixed upon the other parts of the shafts, the arms 92 and the bands 91 being connected by adjusting-screws 93, by which the bands can be tightened onto the rims 90 with sufficient tension to drive the gears and the parts connected therewith and yet yield and permit the gears 62 71 to revolve without danger of breaking or injuring the machine when the gears 60 69 and the parts connected therewith are arrested by the stops 86, as just explained. When the arms 83 are arrested by coming into contact with the stops 86, which have been interposed in the path of the arms, the extensions 88 of the arms will of course continue to be pressed against the stops until the gears have been unclutched from the driving-shaft R, and as the brakes 80 are applied to the gears 62 71 simultaneously with the unclutching the extensions 88 will continue to be held against the stops 86, and might in some cases prevent the stops from falling back to their normal position as soon as released by the pattern or Jacquard mechanism, and thus prevent the movement of the arms 83 for the next stitch in case said movement should be in the same direction as the last movement. In order to prevent this and to release the stops, so as to permit them to fall freely back to their normal position before the next movement of the arms 83, there are provided automatic releasing mechanisms which take the pressure of the extensions 88 off the stops simultaneously with the unclutching of the gears from the driving-shaft R. For this purpose the rock-arms 79 (see Figs. 4, 6, 7, and 10) are extended and pivotally connected at their upper ends to rods 94, which are in turn connected to levers 95, which embrace collars 96, sliding upon the actuating-shafts 61 70. The collars 96 are provided with pins which pass through slots in the shafts and are connected to vertical rods 97, which move in axial openings in the shafts and are connected at their upper ends to toggle-levers 98, which operate bars 99, which slide in ways formed upon the upper sides of the arms 83 and are provided with tapering ends which enter V-shaped recesses 2, formed around the inner peripheries of the frames 84. The recesses 2 are so positioned with relation to the stops 86 that whenever the bar 99 is forced into one of the recesses it will move the arm 83 and its extension 88 slightly to the rearward, so as to relieve the pressure upon any stop with which the extension 88 is then in engagement, and thus leave the stop free to fall to its normal position by its own weight as soon as it is permitted to do so by the pattern or Jacquard mechanism.

The parts are so organized that whenever the rock-arms 79 are rocked in either direction from their central position the rods 94 will operate to rock the levers 95 and through the rods 97 and toggle-levers 98 retract the bars 99, so as to permit the arms 83 to revolve freely. As soon, however, as the rock-arms 79 are restored to their central position, which will be the case whenever the shafts 23 are rocked to their normal positions to unclutch the gears 63 64 72 73, the rods 94 will operate to rock the levers 95 and through the rods 97 and toggle-levers 98 cause the bars 99 to enter the recesses 2 and give a slight rearward movement to the arms 83 and extensions 88 with the effect before stated.

The Jacquard mechanism shown for operating the plates 3 and the stops 86 is as to its general features of the common form, and consequently requires but a brief description. It consists, primarily, (see Figs. 1, 2, 15, and 16,) of a series of cards P, which are hinged together in an endless series in the manner usual in this class of mechanism. The cards P correspond in number to the number of stitches involved in the pattern to be embroidered, and each of the cards is provided with one or more perforations, which indicate the direction, or direction and extent, of the movement of the tambour-frame for that stitch from the position it occupied for the preceding stitch.

The cards are supported in the usual manner, as indicated in Fig. 2, and pass over a prism 41, the sides of which correspond to the size of the cards, and are provided with openings corresponding to the openings in all of the cards of the series. The prism 41 is also provided with sprockets, which enter openings in the ends of the cards and serve to hold the cards in proper position upon the prism and to advance them as the prism is revolved.

Located in front of the prism 41 are a series of spring-seated feelers 42, corresponding in number and position to the holes in all of the cards, and so arranged that when the prism 41 is advanced, so as to bring the card which at any time is upon its face against the ends of the feelers, those feelers which correspond to the openings in that particular card will pass through said openings, while the remaining feelers will be acted upon by the solid portions of the card and be moved inward against the tension of their springs. The feelers 42 are connected to a series of hooks 43, corresponding in number to the feelers, and which are normally in position to be engaged by the bars of a vertically-reciprocating head 44. The hooks 43 are connected by wires 36 with the respective rods 31 of the plates 3 and the respective stops 86.

The gear H is provided upon its outer face with a cam-groove S, in which travels a stud or bowl projecting from a vertical bar 46, the upper end of which is connected to a rock-arm 47, extending from a shaft 48, having rock-arms 49, which are connected by links 74 with the head 44 in such manner that at each revolution of the shaft I the head 44 is raised, thereby engaging with all of the hooks 43, the feelers 42 of which have passed through openings in the Jacquard card. The link 74 is also connected to one arm of a bell-crank lever 75, the opposite arm of which is connected by a link 76 with a rocking frame 77, carrying the prism 41, in such manner that whenever the bar 46 is depressed the frame 77 will be rocked inward and press the card upon the prism 41 against the ends of the feelers, and that whenever the bar 46 is raised the frame 77 will be rocked in the reverse direction, so as to carry the prism 41 away from the feelers, and at the same time through a suitable pawl-and-ratchet mechanism impart a partial revolution to the prism.

For the purpose of restoring the stops 86 to their normal position in case they should stick in the recesses 85 and not fall back to their normal position by their own weight upon being released by the Jacquard mechanism, there are provided a pair of annular frames 89, which are located above the stops 86 in position to engage with the upper ends of all the stops. The two frames 89 will preferably be rigidly connected or made integral, as shown. The frames 89 are supported upon standards 65, which are free to move vertically in guide-openings in the frames 84, and are connected at their lower ends to arms 45, extending from rock-shafts 52. The shafts 52 are also provided with arms 55, which are connected by a rod 40, so that the two shafts will be caused to rock together, and one of the shafts is provided with an arm 39, which is connected by a rod 38 with a rock-arm 37, which rocks freely upon the shaft I, and is provided with a bowl, which enters a cam-groove 34 formed in the vertically-moving bar 46. From this organization it results that whenever the bar 46 is moved upward to raise the head 44 and one or more of the stops 86 the arm 37 will be rocked, so as to rock the shafts 52 and raise the frames 89 away from the stops. On the other hand, whenever the bar 46 is depressed, so as to lower the head 44 and allow the stop or stops which has or have been raised to move back to their normal position, the frames 89 will be moved downward, so as to come against the stop or stops which has or have been raised and force it or them back to its or their normal position.

The frames 89 are provided with projections 33, having openings through which the rods 31 of the plates 3 pass, and which act upon collars upon the rods, so as to force said rods downward when the frames are lowered, in case the springs 35 should fail to act properly.

The operation of the complete machine is as follows: The shaft D being set in motion, the motion of that shaft will be communicated through the gears which have been described to the shafts I and R. The cam S upon the shaft I will operate to depress the bar 46, thereby moving downward the head 44 of the Jacquard mechanism, so as to bring said head below the hooks 43, the bars of the head being so shaped as to allow the hooks to spring past them as the head is depressed. As the head is thus depressed the frame 77, carrying the prism 41, will be swung inward, so as to press the card upon the face of the prism against the ends of the feelers 42. Those feelers which meet the solid portions of the card will be moved inward, so as to move the corresponding hooks 43 away from over the bars of the head 44. Those feelers, however, which do not meet the solid portions of the card will pass through the openings in the card and will not be moved inward, and as a consequence the hooks 43, connected to those feelers, will remain in position to be engaged by the bars of the head 44 upon its upward movement. The particular hooks 43 which will thus be allowed to remain in position to be engaged by the head 44 will be determined by the number and position of the perforations in the card which is upon the face of the prism 41, and these perforations will in turn be determined by the direction and length of the stitch which is to be taken. For the purpose of this description it will be assumed that the stitch to be taken requires that the tambour-frame should be moved upward and to the left a distance in each direction less than the maximum length of stitch which the machine is capacitated to make. The card presented to the feelers 42 will therefore be provided with four openings 22. (See Fig. 16ª.) Two of said openings will correspond to the positions of the feelers which are connected to the hooks 43 for moving the rods 31 and plates 3 for rocking the rods 27 29 into position to be engaged by the heads 56 57, and two of said openings will correspond in position to the feelers 42, connected to the hooks 43 for moving the two stops 86, which are located in proper positions (relatively to the positions of the arms 83 after the last stitch) to arrest said arms after the tambour-frame has been moved the proper distance in each direction. As the shaft I continues its revolution, the cam S will raise the bar 46, and with it the head 44, which will engage with the hooks 43 whose feelers have passed through the openings in the card, and raise said hooks, thereby raising the plates 3, which are connected to the rods 27 29, and rocking said rods into position beneath the shoulders 9 of the heads 56 57, and at the same time raising the two stops 86 to arrest the respective arms 83 after they have moved the required distance. As the head 44 is moved upward, and after it has engaged with the hooks 43, it will, through the connections which have been described, rock the frame 77 outward, so as to remove the prism 41 from the ends of the feelers 42, and at the same time, through the pawl and ratchet, give a partial turn to the prism to bring a new card into position for the next stitch. As the bar 46 is moved upward, it will also, through the connections which have been described, raise the frames 89, so as to permit the upward movement of the stops 86 and plates 3. As the shaft I continues its revolution, and directly after the head 44 has been raised, as just described, the lever 50 will be depressed, thereby moving downward the heads 56 57 and causing them to engage with the rods 27 29, which have been rocked beneath the shoulders 9, so as to depress said rods and thereby rock the shafts 23, so as to remove the brakes 80 from the gears 62 71, and rock the arms 79, so as to raise the rods 97 and operate the toggle-levers 98 to withdraw the bars 99 from the recesses 2 and at the same time clutch the gears 63 72 to the shaft R. As soon as the gears 63 72 are clutched to the shaft R, the gears 62 71 will be set in motion, and will, through the connections which have been described, operate the threaded rods $f$ and $w$ to move the tambour-frame upward and to the left, and this movement will continue until the extensions 88 of the arms 83 are arrested by coming into contact with the stops 86, which have been raised by the Jacquard mechanism, at which time the frame will have moved the proper distance upward and to the left to bring the fabric which it carries into proper position with relation to the needles for the stitch. After the arms 83 have been arrested the friction-bands 91 will turn about the rims 90 and permit the gears 62 71 to turn idly until they are arrested by the unclutching of the gears 63 72, as will be presently explained. After the tambour-frame has been arrested the shaft I will continue its revolution until it has completed something more than half a revolution from the point of starting, when the arm 50 will be rocked in the reverse direction, thereby raising the heads 56 57. Directly after the heads 56 57 are thus raised the cams 78 will, through the arms 79, rock the shafts 23 back to their normal position, thereby unclutching the gears 63 72 from the shaft R and at the same time applying the brakes 80 to the gears 62 71, and also at the same time rocking the levers 95, so as to depress the rods 97 and through the toggles 98 move the bars 99 into the recesses 2, so as to move the extensions 88 of the arms 83 slightly away from the stops 86. After this has been accomplished the needle mechanism will be operated to form the stitches in the fabric, and during the operation of the needles the shaft I will complete its revolution from the point of starting, and so the operation will continue to be repeated. As the bar 46 is moved downward to lower the head 44 and advance the prism 41 against the ends of the feelers 42 upon the next revolution of the shaft I, it will, through the connections which have been described, depress the frames 89, so as to restore to their normal position the plates 3 and stops 86 which have been raised in case the springs 35 should fail to act or the stops should stick and not move freely backward to their normal position by their own weight.

The perforations in the cards for the successive stitches will be varied in number from one to four, according to the direction and extent of the movement of the tambour-frame required for each succeeding stitch from its position for the preceding stitch, the positions of the perforations being varied upon the cards to correspond with the positions of the feelers which control the direction and determine the extent of the movement of the frame.

In practice there is always a possibility that some one or more of the hooks 43, which should engage with the head 44 upon its upward movement, may fail to engage with the head so as to be raised, and if this should occur it would result in the production of an imperfect stitch. To obviate this, or at least to render the liability of its happening extremely unlikely, it has been found desirable in practice to connect the wires 36 of the rods 31 to two separate hooks, and to provide the cards of the Jacquard with duplicate perforations, as indicated by dotted lines in Fig. 16ª, so that if the feeler for one of the hooks fails to enter its perforation in the card, or if for any other reason one of the hooks fails to engage with the frame 44, the other hook will still be available to move the plate 3, with which the two hooks are connected. For the same reason it has been found desirable to duplicate the perforations in the card for controlling the stops 86, as also indicated by dotted lines in Fig. 16ª, so that two adjacent stops will be raised. By this means, if, for any reason, the hook connected to one of the two stops fails to act to raise the stop, the other hook will act to raise the adjacent stop and arrest the tambour-frame in substantially the proper position.

For the purpose of readily stopping and starting the machine without shifting the belt F, the driving-pulley E is mounted to turn freely upon the shaft D, and is provided with a clutch mechanism (see Figs. 17, 18, and 19) by which it can be clutched to and released from the shaft at the will of the attendant. This clutch mechanism is similar in construction to that employed in connection with the gears upon the shaft R. It consists of a friction-band 100, located within the rim of the pulley and having one end fixed to one of the arms extending from a collar 101 upon the shaft. The free end of the band 100 is connected to the other of the arms by means of a spring 102, the tendency of which is to contract the band, so as to reduce or entirely remove the friction between it and the rim of the pulley. Fulcrumed upon the fixed end of the band is a lever 103, having a stud or set-screw which abuts against a shoulder upon the free end of the band in such manner as to expand the band and press it outward against the rim of the pulley. The shaft D also carries a freely-moving sleeve 104, having a wedge 105, the end of which enters between the end of the lever 103 and a stud projecting from the collar 101 in such manner as to rock the lever and expand the band, as before stated. The sleeve 104 is provided with a circumferential groove, into which enters a fork 124, carried by a sliding bar 106, which is connected to a hand-lever 107 in such manner that the bar can be shifted to insert and withdraw the wedge 105 and clutch and unclutch the driving-pulley E whenever it is desired to start and stop the machine.

As the parts of the machine are quite heavy and acquire considerable momentum when in motion, it is desirable, in order to bring them to rest promptly when the driving-pulley is unclutched from its shaft, to provide a brake mechanism which will be applied simultaneously with the unclutching of the pulley. For this purpose the driving-shaft is provided with a brake-pulley T, against which works a brake-shoe 108, which is fulcrumed to the frame-work and is acted upon by an inclined plate 109, carried by the bar 106 in such manner as to be applied to the pulley T simultaneously with the unclutching of the pulley E, and vice versa. After the machine has been stopped by the application of the brake-shoe 108 it is sometimes desirable to remove the brake, so as to permit the machine to be operated slowly by hand while the pulley E remains unclutched from the driving-shaft. To permit this, the inclined plate 109 is pivoted to the bar 106, and is maintained in its raised position, so as to act upon the brake-shoe, by means of a locking-pin 140, which passes through an opening in the plate and enters a corresponding opening in the bar. This pin is provided with a pivoted hand-lever 110, by which it can be withdrawn from the opening in the bar 106, so as to permit the plate 109 to rock downward and remove the brake-shoe from the pulley when it is desired to operate the machine without clutching the driving-pulley to the driving-shaft. The hand-lever 110 is acted upon by a spring 24 in such manner as to normally hold the pin 140 within the opening in the bar 106.

For the purpose of restoring the inclined plate 109 to its raised position after it has been lowered, so that it will be in position to apply the brake upon the unclutching of the pulley E, the plate is provided with an extension 26, which is arranged to engage with an inclined shoulder 32, formed upon a stationary part of the frame-work, whenever the bar 106 is shifted, so as to clutch the pulley E to the driving-shaft, and thus raise the plate 109 into position to permit the pin 140 to enter the opening in the bar 106 and retain the plate in its raised position.

When the machine is temporarily stopped during the operation of embroidering a pattern, it is desirable that the parts should be arrested in such position that the needles will be withdrawn from the fabric, so that the fabric will be more readily accessible at the immediate points where the stitches are being formed, and so also that the tambour-frame can be moved and adjusted, if desired. To provide for this, one of the bearings of the shaft I is provided with an inwardly-extending boss 112, which forms a stationary sleeve around the shaft, and upon this sleeve there is mounted to turn freely a disk 113, having a V-shaped recess in its periphery, into which enters a spring-pressed pin 114, which acts to normally hold the disk stationary. The disk 113 carries upon its inner face a pawl 115, having a spring the tendency of which is to rock the pawl inward into the path of a stud 116, carried by a collar 117, fixed upon the shaft I.

The pawl 115 is carried upon a short shaft which passes through the disk and carries at its opposite end a curved arm 118, which is normally held in position to rock the pawl outward out of the path of the stud 116 by means of a spring-pressed pin 119, which acts upon the outer side of the arm 118. The disk 113 is also provided with a cam-shaped flange 120, which, when the disk is revolved, as will be presently explained, engages with a stud 121, projecting from the lower edge of the bar 106 in such manner as to move the bar inward and unclutch the gear E from the shaft D, and also apply the brake-shoe 108 to stop the machine, as before explained. The pin 119 is acted on by a wedge 122, which is so arranged that when moved upward it will withdraw the pin 119 and release the arm 118, so as to permit the pawl 115 to move inward into the path of the stud 116. The wedge 122 is connected to a rod or other connection 123, which extends to a point convenient to the attendant.

The operation of this automatic stopping mechanism is as follows: When the attendant desires to stop the machine and arrest the parts in such position that the needles will be withdrawn from the fabric, he will, through the connection 123, operate the wedge 122, so as to withdraw the pin 119 and release the arm 118. The pawl 115 will then be swung inward into the path of the stud 116, and as the shaft I revolves the stud 116 will come into engagement with the pawl 115 and cause the disk 113 to revolve with the shaft. As the disk is thus revolved with the shaft I, the cam 120 will engage with the stud 121 and shift the bar 106 inward, so as to unclutch the gear E and at the same time apply the brake-shoe to the pulley T and stop the machine, and the parts will be so timed that this will take place at the particular point in the revolution of the shaft I when the needles are withdrawn from the fabric. To start the machine again, the attendant will, through the lever 107, shift the bar 106 in the reverse direction, so as to remove the brake and clutch the pulley E to the shaft. The wedge 122 having in the meantime been released will have moved downward, so as to permit the pin 119 to assume its normal position, and as the shaft I revolves the arm 118 will come into engagement with the pin 119 and be rocked inward, so as to remove the pawl 115 from engagement with the stop 116 and thus release the disk 113 from the shaft, and at the same time the pin 114 will enter the V-shaped recess in the periphery of the disk and hold it in the position it occupies when released from the shaft.

In addition to the means for stopping the machine by the hand-lever 107, or automatically through the connections put in operation by the wedge 122, it may in some cases be desirable to provide means by which the machine will be automatically stopped in case, for any reason, the pattern or Jacquard mechanism fails to raise the proper stop or stops 86. If this should happen there would be nothing interposed in the path of the arm or arms 83, and as a result said arm or arms would continue to turn with its or their shaft or shafts until the gear or gears through which it or they are driven are unclutched from the shaft by the action of the cams 78, and the result would be that the tambour-frame would be moved in one or both directions more than the proper distance, so that a stitch of improper length would be taken, thus making a defect in the work which it would be desirable to correct before another stitch was taken, and in such case as this it is desirable, as before stated, to stop the machine at once. Means for accomplishing this automatically is illustrated in Figs. 20 and 21. For this purpose the pin 119 is connected at its outer end to the armature 125 of an electro-magnet 126 in such manner that when the magnet is energized the pin will be withdrawn from engagement with the arm 118 and permit the pawl 115 to drop into position to be engaged by the stop 116 and thus automatically stop the machine, as before explained. The electro-magnet 126 is herein illustrated as of the form in which the cores are drawn into the helices; but it may be of ordinary form, if preferred. The opposite poles of the magnet 126 are connected by wires 127 128 with pairs of stationary metallic rings 129 130, which surround the respective shafts 61 70. The arms 83 of the respective shafts 61 70 are provided with brushes 131 132, which rest upon the respective rings 129 130 and maintain contact therewith as the arms 83 move with the shafts. The rings 129 130 are insulated from each other and from their support, and the brushes 131 132 are also insulated from each other and from the arms 83. The arms 83 are provided upon their upper sides with sliding heads 133, which move in ways formed in the upper sides of the arms and carry feelers 134, which extend downward at the sides of the arms in position to enter the channels formed by the recesses in the stops 86 when said stops are in their depressed position. The heads 133 are provided with slots through which pass pins 135, connected to the sliding bars 99, and located in the slots in the heads 133 are springs 136, the tendency of which is to move the heads 133 outward against the pins 135. The brushes 131 132 are connected by wires 137 138 with the opposite sides of the arms 83, said wires passing through insulating-blocks in the arms and terminating in contact-points upon the inside of the ways in which the heads 133 move. Opposite the terminals of the wires 137 138 the heads 133 are recessed, as shown at 139, so as to be out of contact with the terminals of said wires when the heads are in their normal position.

The operation of the apparatus thus organized is as follows: When the toggle-levers 98 are operated to advance the bars 99 into the recesses 2, as hereinbefore explained, the springs 136 will cause the heads 133 and feelers 134 to advance with them. If the arms 83 have been arrested by coming into contact with the stops 86, as will be the case when the machine is operating properly, one of the feelers 134 of each of the heads 133 will come into engagement with the stop which has been raised to arrest the arm 83 and thereby arrest the feelers and the heads 133 before the heads have advanced sufficiently to come into contact with the terminals of the wires 137 138. The bars 99 will, however, continue to be advanced against the tension of the springs 136. Neither of the circuits through the magnet 126 will therefore be closed and the machine will not be stopped. If, however, either one or both of the arms 83 fails to be arrested by a stop 86, which will be the case when the pattern or Jacquard mechanism fails to properly operate the stops, the feeler of the head 133 will not, as it is advanced by the movement of the bar 99, meet with a stop, but will enter the recess in the stop and permit the head 133 to be advanced with the bar 99 to the full extent of the movement of said bar, and this will cause the head to be advanced so far as to bring its solid portions into contact with the terminals of the wires 137 138, and thereby complete a circuit through said wires, the brushes and rings, and the wires 127 or 128, as the case may be, and the magnet 126, so as to withdraw the pin 119 and cause the machine to be automatically stopped, as hereinbefore explained. The circuits formed by the wires 127 128 and their connections will of course be supplied with suitable battery-power, as indicated at V. In order to prevent either of the circuits from being closed by the advance of the feelers when the stops are restored to their depressed position by the downward movement of the frames 89, the circuits are provided with circuit closers and breakers, which are automatically operated to break the circuits before the bars 99 have quite reached the limit of their inward movement and maintain the circuits broken until after the bars have been retracted a certain distance. For this purpose each of the cams 82 is made to form one member of a circuit-closer for each of the circuits, one wire being connected to the cam and the other wire to a contact-point located opposite a recess 141 in the cam and in such position that when the cam is in its mid-position the circuit will be broken and that when the cam is rocked in either direction from its mid-position the circuit will be closed, as indicated in Fig. 21.

What I claim is—

1. The combination, with a tambour-frame, of a rotative actuating-shaft by which said frame is moved in opposite directions and movable stops for arresting said shaft in various positions, whereby the length of the stitches is determined, substantially as described.

2. The combination, with a tambour-frame, of a rotative actuating-shaft by which said frame is moved in opposite directions, movable stops for arresting said shaft in various positions, whereby the length of the stitches is determined, and a pattern mechanism for controlling said stops, substantially as described.

3. The combination, with a tambour-frame, of a rotative actuating-shaft by which said frame is moved in opposite directions, movable stops for arresting said frame in various positions, whereby the length of the stitches is determined, and a yielding connection between said shaft and its driver, substantially as described.

4. The combination, with the tambour-frame and its two-part actuating-shaft, of a yielding connection between the parts of said shaft, means for rotating the shaft in opposite directions, and movable stops for limiting the movement of the shaft, substantially as described.

5. The combination, with the tambour-frame and its two-part actuating-shaft, of a yielding connection between the parts of said shaft, means for rotating the shaft in opposite directions, movable stops for limiting the movement of the shaft, and a pattern mechanism for controlling said stops, substantially as described.

6. The combination, with the tambour-frame and its two-part actuating-shaft, of a yielding connection between the parts of said shaft, reversing-gearing for rotating the shaft in opposite directions, movable stops for limiting the movement of the shaft, and clutches for coupling the reversing-gearing, substantially as described.

7. The combination, with the tambour-frame and its two-part actuating-shaft, of a yielding connection between the parts of said shaft, reversing-gearing for rotating the shaft in opposite directions, movable stops for limiting the movement of the shaft, clutches for coupling the reversing-gearing, and a pattern mechanism for controlling the action of the clutches, substantially as described.

8. The combination, with the tambour-frame and its two-part actuating-shaft, of a yielding connection between the parts of said shaft, reversing-gearing for rotating the shaft in opposite directions, movable stops for limiting the movement of the shaft, clutches for coupling the reversing-gearing, and pattern mechanisms for controlling the clutches and stops, substantially as described.

9. The combination, with the movable tambour-frame and its driving-shaft, of a yielding connection for imparting movement to the frame from said shaft and movable stops for limiting the movement of said frame, substantially as described.

10. The combination, with the movable tambour-frame and its driving-shaft, of a yielding connection for imparting movement to the frame from said shaft, movable stops for limiting the movement of said frame, and a pattern mechanism for controlling said movable stops, substantially as described.

11. The combination, with the movable tambour-frame, of a driving-shaft R, connecting mechanism, including reversing-gearing and a yielding connection, for imparting movement from said shaft to the tambour-frame in opposite directions, and movable stops for limiting the movement of the tambour-frame in both directions, substantially as described.

12. The combination, with the movable tambour-frame, of a driving-shaft R, connecting mechanism, including reversing-gearing and a yielding connection, for imparting movement from said shaft to the tambour-frame in opposite directions, movable stops for limiting the movement of the tambour-frame in both directions, and a pattern mechanism for controlling said stops, substantially as described.

13. The combination, with the movable tambour-frame, of a driving-shaft R, connecting mechanism, including reversing-gearing and a yielding connection, for imparting movement from said shaft to the tambour-frame in opposite directions, movable stops for limiting the movement of the tambour-frame in both directions, and a pattern mechanism for controlling said reversing-gearing to move the frame in either direction, substantially as described.

14. The combination, with the movable tambour-frame, of a driving-shaft R, connecting mechanism, including reversing-gearing and a yielding connection, for imparting movement from said shaft to the tambour-frame in opposite directions, movable stops for limiting the movement of the tambour-frame in both directions, and pattern mechanisms for controlling said reversing-gearing and said stops, substantially as described.

15. The combination, with the movable tambour-frame, of a driving-shaft R, connecting mechanism, including reversing-gears and a yielding connection, for imparting movement from said shaft to the tambour-frame in opposite directions, clutches for connecting and disconnecting said reversing-gears, and movable stops for limiting the movement of the tambour-frame in both directions, substantially as described.

16. The combination, with the movable tambour-frame, of a driving-shaft R, connecting mechanism, including reversing-gears and a yielding connection, for imparting movement from said shaft to the tambour-frame in opposite directions, clutches for connecting and disconnecting said reversing-gears, movable stops for limiting the movement of the tambour-frame in both directions, and a pattern mechanism for controlling said stops, substantially as described.

17. The combination, with the movable tambour-frame, of a driving-shaft R, connecting mechanism, including reversing-gears and a yielding connection, for imparting movement from said shaft to the tambour-frame in opposite directions, clutches for connecting and disconnecting said reversing-gears, movable stops for limiting the movement of the tambour-frame in both directions, and a pattern mechanism for controlling said clutches to move the frame in either direction, substantially as described.

18. The combination, with the movable tambour-frame, of a driving-shaft R, connecting mechanism, including reversing-gears and a yielding connection, for imparting movement from said shaft to the tambour-frame in opposite directions, clutches for connecting and disconnecting said reversing-gears, movable stops for limiting the movement of the tambour-frame in both directions, and pattern mechanisms for controlling said clutches and said stops, substantially as described.

19. The combination, with the movable tambour-frame, of a driving-shaft R, connecting mechanisms, each including reversing-gearing and yielding connections, for imparting movement from said shaft to the tambour-frame in opposite directions and in directions crosswise of each other, and movable stops for limiting the movement of the tambour-frame in each direction, substantially as described.

20. The combination, with the movable tambour-frame, of a driving-shaft R, connecting mechanisms, each including reversing-gears and yielding connections, for imparting movement from said shaft to the tambour-frame in opposite directions and in directions crosswise of each other, clutches for connecting and disconnecting said reversing-gears, and movable stops for limiting the movement of the tambour-frame in each direction, substantially as described.

21. The combination, with the movable tambour-frame, of a driving-shaft R, connecting mechanism, including reversing-gearing and yielding connections, for imparting movement from said shaft to the tambour-frame in opposite directions and in directions crosswise of each other, and movable stops for limiting the movement of the tambour-frame in each direction, and a pattern mechanism for controlling said stops, substantially as described.

22. The combination, with the movable tambour-frame, of a driving-shaft R, connecting mechanism, including reversing-gears and yielding connections, for imparting movement from said shaft to the tambour-frame in opposite directions and in directions crosswise of each other, clutches for connecting and disconnecting said reversing-gears, and movable stops for limiting the movement of the tambour-frame in each direction, and a pattern mechanism for controlling said stops, substantially as described.

23. The combination, with the movable tambour-frame, of a driving-shaft R, connecting mechanism, including reversing-gears and yielding connections, for imparting movement from said shaft to the tambour-frame in opposite directions and in directions crosswise of each other, movable stops for limiting the movement of the tambour-frame in each direction, and a pattern mechanism for controlling said reversing-gearing to move the frame in either direction, substantially as described.

24. The combination, with the movable tambour-frame, of a driving-shaft R, connecting mechanism, including reversing-gears and yielding connections, for imparting movement from said shaft to the tambour-frame in opposite directions and in directions crosswise of each other, clutches for connecting and disconnecting said reversing-gears, movable stops for limiting the movement of the tambour-frame in each direction, and a pattern mechanism for controlling said clutches to move the frame in either direction, substantially as described.

25. The combination, with the movable tambour-frame, of a driving-shaft R, connecting mechanism, including reversing-gearing and yielding connections, for imparting movement from said shaft to the tambour-frame in opposite directions and in directions crosswise of each other, movable stops for limiting the movement of the tambour-frame in each direction, and pattern mechanisms for controlling said stops and said reversing-gearing to move the frame in either direction, substantially as described.

26. The combination, with the movable tambour-frame, of a driving-shaft R, connecting mechanism, including reversing-gears and yielding connections, for imparting movement from said shaft to the tambour-frame in opposite directions and in directions crosswise of each other, clutches for connecting and disconnecting said reversing-gears, movable stops for limiting the movement of the tambour-frame in each direction, and pattern mechanisms for controlling said stops and said clutches to move the frame in either direction, substantially as described.

27. The combination, with the tambour-frame and a driving-shaft for moving the same, of a bevel-wheel loose on said shaft and geared with the tambour-frame-actuating shaft, a clutch for coupling said wheel to the shaft, and a pattern mechanism for controlling the movements of said clutch, substantially as described.

28. The combination, with the tambour-frame and a driving-shaft for moving the same, of companion bevel-wheels loose on said shaft and geared with the tambour-frame-actuating shaft, clutches for coupling said wheels to the shaft, and a pattern mechanism for controlling the movements of said clutches, substantially as described.

29. The combination, with the tambour-frame and a driving-shaft for moving the same, of two pairs of companion bevel-wheels loose on said shaft, each pair geared with one of the tambour-frame-actuating shafts, clutches for coupling said wheels to the shaft, and a pattern mechanism for controlling the movements of said clutches, substantially as described.

30. The combination, with the tambour-frame and a driving-shaft for moving the same, of a bevel-wheel loose on said shaft and geared with the tambour-frame-actuating shaft, a clutch for coupling said wheel to the shaft, a yielding connection between the driving-shaft and tambour-frame, and movable stops for arresting said frame, substantially as described.

31. The combination, with the tambour-frame and a driving-shaft for moving the same, of companion bevel-wheels loose on said shaft and geared with the tambour-frame-actuating shaft, clutches for coupling said wheels to the shaft, a yielding connection between the driving-shaft and tambour-frame, and movable stops for arresting said frame, substantially as described.

32. The combination, with the tambour-frame and a driving-shaft for moving the same, of two pairs of companion bevel-wheels loose on said shaft, each pair geared with one of the tambour-frame-actuating shafts, clutches for coupling said wheels to the shaft, a yielding connection between the driving-shaft and tambour-frame, and movable stops for arresting said frame, substantially as described.

33. The combination, with the tambour-frame and a driving-shaft for moving the same, of a bevel-wheel loose on said shaft and geared with the tambour-frame-actuating shaft, a clutch for coupling said wheel to the shaft, a yielding connection between the driving-shaft and tambour-frame, movable stops for arresting said frame, and pattern mechanisms for controlling the movements of the stops and clutch, substantially as described.

34. The combination, with the tambour-frame and a driving-shaft for moving the same, of companion bevel-wheels loose on said shaft and geared with the tambour-frame-actuating shaft, clutches for coupling said wheels to the shaft, a yielding connection between the driving-shaft and tambour-frame, movable stops for arresting said frame, and pattern mechanisms for controlling the movements of the stops and clutches, substantially as described.

35. The combination, with the tambour-frame and a driving-shaft for moving the same, of two pairs of companion bevel-wheels loose on said shaft, each pair geared with one of the tambour-frame-actuating shafts, clutches for coupling said wheels to the shafts, a yielding connection between the driving-shaft and tambour-frame, movable stops for arresting the frame, and pattern mechanisms for controlling the movements of the stops and clutches, substantially as described.

36. The combination, with the tambour-frame, of the screw shafts and nuts $f$ $g$ for imparting up and down movements to the frame, and the rods $b$, each having a universal joint at both its ends for transmitting the movement derived from the shafts and nuts to the frame, substantially as described.

37. The combination, with the balancing-levers $p$, carrying the pulleys $l$, of the tambour-frame supported upon said pulleys, the screw-rods $f$ and nuts $g$, and the rods $b$, connected to said levers and to said nuts or screw-shafts by universal joints, substantially as described.

38. The combination, with the tambour-frame of an embroidery-machine, a gear 60 or 69 for moving the same, and a yielding connection through which said gear is driven, of an arm 83, moving with said gear and frame, and a series of movable stops 86, for arresting the arm and frame without arresting the driving mechanism, substantially as described.

39. The combination, with the tambour-frame of an embroidery-machine, a gear 60 or 69 for moving the same in opposite directions, according to the direction in which said gear is revolved, and a yielding connection through which said gear is driven, of an arm 83, moving with said gear and frame, and a series of movable stops 86, for arresting the arm and frame as they are moved in either direction without arresting the driving mechanism, substantially as described.

40. The combination, with the tambour-frame of an embroidery-machine, a gear 60 or 69 for moving the same, and a yielding connection through which said gear is driven, of an arm 83, moving with said gear and frame, and a series of movable stops 86, for arresting the arm and frame without arresting the driving mechanism, and a pattern mechanism for controlling said stops, substantially as described.

41. The combination, with the tambour-frame of an embroidery-machine, a gear 60 or 69 for moving the same in opposite directions, according to the direction in which said gear is revolved, and a yielding connection through which said gear is driven, of an arm 83, moving with said gear and frame, and a series of movable stops 86, for arresting the arm and frame as they are moved in either direction without arresting the driving mechanism, and a pattern mechanism for controlling said stops, substantially as described.

42. The combination, with the tambour-frame of an embroidery-machine, a gear 60 or 69 for moving the same, and a yielding connection through which said gear is driven, of an arm 83, moving with said gear and frame, and a series of movable stops 86, for arresting the arm and frame without arresting the driving mechanism, and a reciprocating frame 89, acting upon said stops to restore them to their normal position, substantially as described.

43. The combination, with the tambour-frame of an embroidery-machine, a gear 60 or 69 for moving the same, and a yielding connection through which said gear is driven, of an arm 83, moving with said gear and frame, a series of movable stops 86, for arresting the arm and frame without arresting the driving mechanism, and means for imparting a slight backward movement to said arm after it has been arrested to release the stop, substantially as described.

44. The combination, with the tambour-frame of an embroidery-machine, a gear 60 or 69 for moving the same, and a yielding connection through which said gear is driven, of an arm 83, moving with said gear and frame, a series of movable stops 86, for arresting the arm and frame without arresting the driving mechanism, the series of recesses 2, corresponding to the stops, and the reciprocating bar 99, carried by the arm 83 and arranged to enter one of said recesses after the arm is arrested and move the arm slightly backward to release the stop, substantially as described.

45. The combination, with the tambour-frame of an embroidery-machine, a driving-shaft therefor, and a yielding connection through which the movement of said shaft is transmitted to the frame, of an arm 83, moving with said frame, and a series of movable stops for arresting said arm and frame without arresting the driving mechanism, substantially as described.

46. The combination, with the tambour-frame of an embroidery-machine, a driving-shaft therefor, and a yielding connection through which the movement of said shaft is transmitted to the frame, of an arm 83, moving with said frame, and a series of movable stops for arresting said arm and frame without arresting the driving mechanism, and a reciprocating frame 89, acting upon said stops to restore them to their normal position, substantially as described.

47. The combination, with the tambour-frame of an embroidery-machine, a driving-shaft therefor, and a yielding connection through which the movement of said shaft is transmitted to the frame, of an arm 83, moving with said frame, and a series of movable stops for arresting said arm and frame without arresting the driving mechanism, and means for imparting a slight backward movement to said arm after it has been arrested to release the stop, substantially as described.

48. The combination, in an embroidery-machine, of a driving-shaft R, a loose gear 63 or 64, means for imparting its movement to the tambour-frame, a clutch for connecting and disconnecting said gear to and from the shaft, a movable rod 27 or 28, connected to operate said clutch to clutch the gear, and a reciprocating head 56, arranged to engage with said rod or not, according to the position of the rod, substantially as described.

49. The combination, in an embroidery-machine, of a driving-shaft R, a loose gear 63 or 64, means for imparting its movement to the tambour-frame, a clutch for connecting and disconnecting said gear to and from the shaft, a movable rod 27 or 28, connected to operate said clutch to clutch the gear, and a reciprocating head 56, arranged to engage with said rod or not, according to the position of the rod, and a pattern mechanism for controlling the position of said rod, substantially as described.

50. The combination, in an embroidery-machine, of a driving-shaft R, a loose gear 63 or 64, means for imparting its movement to the tambour-frame, a clutch for connecting and disconnecting said gear to and from the shaft, a movable rod 27 or 28, connected to operate said clutch to clutch the gear, and a reciprocating head 56, arranged to engage with said rod or not, according to the position of the rod, and a cam 78, for operating said clutch to unclutch the gear, substantially as described.

51. The combination, in an embroidery-machine, of a driving-shaft R, loose reversing-gears 63 64, means for imparting their movement to the tambour-frame in reverse directions, clutches for connecting and disconnecting said gears to and from their shaft, movable rods 27 28, connected to operate said respective clutches to clutch the gears, and a reciprocating head 56, arranged to engage with one of said rods or not, according to the position of the rods, substantially as described.

52. The combination, in an embroidery-machine, of a driving-shaft R, loose reversing-gears 63 64, means for imparting their movement to the tambour-frame in reverse directions, clutches for connecting and disconnecting said gears to and from their shaft, movable rods 27 28, connected to operate said respective clutches to clutch the gears, and a reciprocating head 56, arranged to engage with one of said rods or not, according to the position of the rods, and a pattern mechanism for controlling the position of said rods, substantially as described.

53. The combination, in an embroidery-machine, of a driving-shaft R, loose reversing-gears 63 64, means for imparting their movement to the tambour-frame in reverse directions, clutches for connecting and disconnecting said gears to and from their shaft, movable rods 27 28, connected to operate said respective clutches to clutch the gears, and a reciprocating head 56, arranged to engage with one of said rods or not, according to the position of the rods, and a cam 78, for operating said clutches to unclutch the gears, substantially as described.

54. The combination, with a tambour-frame, of a rotative actuating-shaft by which said frame is moved in opposite directions, movable stops for arresting said frame in various positions, whereby the length of the stitches is determined, a pattern mechanism for controlling said stops, and a yielding connection between said shaft and its driver, substantially as described.

In testimony whereof I have hereunto set my hand in the presence of two subscribing witnesses.

JOSEPH IRISH.

Witnesses:
   J. J. KENNEDY,
   GEO. H. BOTTS.